(12) United States Patent
McIntyre

(10) Patent No.: US 12,326,072 B2
(45) Date of Patent: *Jun. 10, 2025

(54) OIL PRODUCTION SYSTEM AND METHOD

(71) Applicant: Jack McIntyre, San Angelo, TX (US)

(72) Inventor: Jack McIntyre, San Angelo, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,497

(22) Filed: Nov. 14, 2023

(65) Prior Publication Data

US 2024/0093581 A1 Mar. 21, 2024

Related U.S. Application Data

(63) Continuation of application No. 17/553,073, filed on Dec. 16, 2021, now Pat. No. 11,851,996.

(60) Provisional application No. 63/127,656, filed on Dec. 18, 2020.

(51) Int. Cl.
*E21B 43/01* (2006.01)
*C09K 8/592* (2006.01)
*E21B 43/16* (2006.01)
*E21B 43/248* (2006.01)
*E21B 47/07* (2012.01)

(52) U.S. Cl.
CPC ............ *E21B 43/162* (2013.01); *C09K 8/592* (2013.01); *E21B 43/01* (2013.01); *E21B 43/248* (2013.01); *E21B 47/07* (2020.05)

(58) Field of Classification Search
CPC ........ E21B 43/01; E21B 43/16; E21B 43/162; E21B 43/243; E21B 43/248; E21B 47/07; C09K 8/592

See application file for complete search history.

(56) References Cited

U.S. PATENT DOCUMENTS

| 2,672,201 | A | * | 3/1954 | Lorenz | C09K 8/845 507/935 |
| 4,007,791 | A | * | 2/1977 | Johnson | E21B 43/24 166/300 |
| 4,372,381 | A | * | 2/1983 | McMillen | C09K 8/58 166/402 |
| 7,946,342 | B1 | * | 5/2011 | Robertson | E21B 43/24 166/263 |
| 9,291,043 | B1 | | 3/2016 | Affholter et al. | |

(Continued)

FOREIGN PATENT DOCUMENTS

RU 2679027 C2 2/2019
WO 2020226672 A1 11/2020

OTHER PUBLICATIONS

PCT Search Report with Written Opinion issued on PCT/US22/47743; Jan. 31, 2023; 6 pages.

(Continued)

*Primary Examiner* — Matthew R Buck
(74) *Attorney, Agent, or Firm* — Braxton Perrone, PLLC; Bobby W. Braxton; Gregory Perrone

(57) ABSTRACT

An oil production system and method. The system includes a system for heating unrecovered oil. The system includes a chemical injection well having at least one subterranean outlet. The system also includes an oil production well with at least one subterranean inlet. The subterranean outlet is lower in elevation than the at least one inlet. The chemical injection well is coupled to an injected reactant source, and wherein said injected reactant source reacts with a second reactant in an exothermic reaction.

11 Claims, 3 Drawing Sheets

(56) References Cited

U.S. PATENT DOCUMENTS

| | | | | |
|---|---|---|---|---|
| 9,803,133 | B2* | 10/2017 | Al-Nakhli | E21B 43/25 |
| 11,091,688 | B2* | 8/2021 | Bataweel | E21B 43/13 |
| 11,851,996 | B2* | 12/2023 | McIntyre | C09K 8/592 |
| 2006/0081374 | A1* | 4/2006 | Bland | E21B 43/24 |
| | | | | 166/302 |
| 2010/0200224 | A1* | 8/2010 | Toguem Nguete | E21B 44/00 |
| | | | | 166/250.15 |
| 2012/0199354 | A1 | 8/2012 | Kaminsky | |
| 2013/0068462 | A1 | 3/2013 | Pantano | |
| 2015/0204179 | A1* | 7/2015 | Affholter | E21B 43/24 |
| | | | | 166/245 |
| 2016/0245060 | A1 | 8/2016 | Krumrine et al. | |
| 2016/0281482 | A1 | 9/2016 | Nguyen et al. | |
| 2017/0081950 | A1 | 3/2017 | Filatyev et al. | |
| 2019/0024488 | A1* | 1/2019 | Filatyev | E21B 43/2408 |

OTHER PUBLICATIONS

PCT Search Report with Written Opinion issued on PCT/US2021/063954; Mar. 16, 2022; 9 pages.

Rath, Surajeet; Enhanced Oil Recovery; An Innovative Approach to Optimize Liquid Hydrocarbon Recovery in a Depleted Reservoir; The 2nd South Asian Geoscience Conference and Exhibition; GEOIndia2021; Jan. 20211; http://www.apginda.org/document/700; 12 pages.

Office Action dated Mar. 25, 2024, received in connection with related Russian Patent Application No. 2023118288; 8 pages.

Surajeet Rath, Enhanced Oil Recovery: An Innovative Approach to Optimize Liquid Hydrocarbon Recovery in a Depleted Reservoir; Search and Discovery Article #41068 (2012). posted Nov. 19, 2012, 10 pages.

* cited by examiner

OIL PRODUCTION SYSTEM AND METHOD

PRIORITY

This application is a continuation of allowed U.S. Non-Provisional application Ser. No. 17/553,073 filed Dec. 16, 2021, which claims priority to U.S. Provisional Application Ser. No. 63/127,656 filed Dec. 18, 2020, the entirety of both of which are hereby incorporated by reference.

BACKGROUND OF THE INVENTION

Technical Field

The present invention relates to a system and method for oil production.

Description of Related Art

There are many different approaches to obtaining oil from a well. As the pressure decreases in a well, and as the well is depleted, the production through that well decreases. Consequently, there is a need to optimize oil production through a well.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
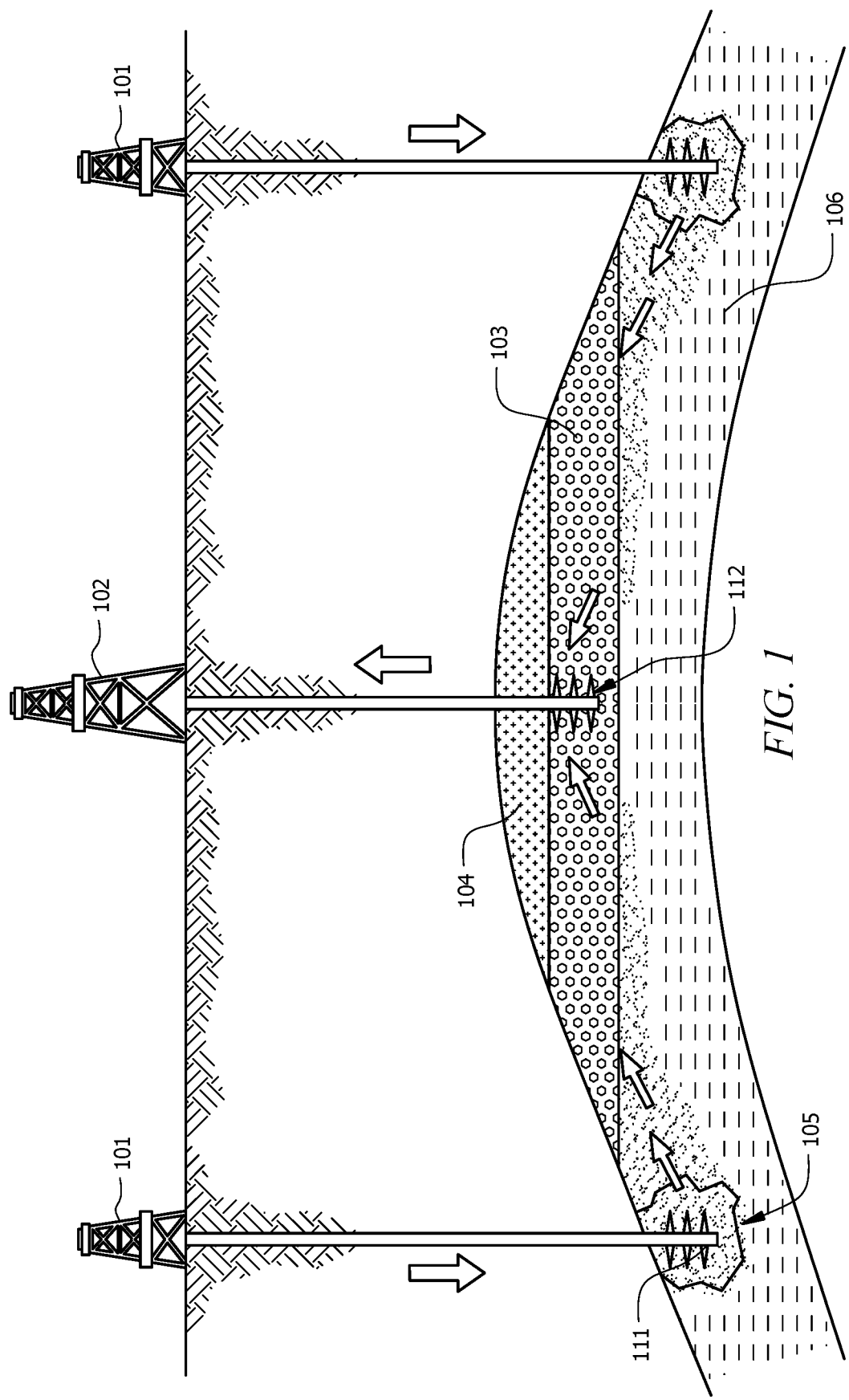
FIG. 1 is a schematic of an oil well in one embodiment.

FIG. 1 is a schematic of an oil well in one embodiment. The oil well 102 can comprise virtually oil or gas production well known in the art. These can include vertical, horizontal, and virtually any type of well developed to bring oil or gas to the surface.

These wells are often drilled to a specified depth where they are in contact with oil or gas. As depicted in FIG. 1, the oil production well 102 is drilled to be within the oil zone 103. Pressure causes oil within the oil zone 103 to pull upwardly within the oil production well 102 via a subterranean inlet 112. From there it can be separated, sorted, and processed for subsequent use.

The oil is typically housed within porous rock. As the readily available oil has been withdrawn, the rate of production decreases. Eventually, the rate of production decreases to a point where the operator decides it is not economically viable to continue operation of the well. The operator then plugs the well such that it cannot produce further oil or gas.

However, if the production life, the length of time that a production well is economically viable, can be increased, the operator and landowner both benefit. The production life of a well can be increased by providing conditions such that oil and/or gas remain at a viable production rate for a longer period of time.

In one embodiment, discussed herein, the production life is increased by use of a chemical injection well 101. A chemical injection well 101 can comprise virtually any well which allows for the introduction of a chemical, solid, slurry, liquid, etc. which produces the desired reaction. The chemical injection wells 101 can comprise the same oil production well 102 or a separate and apart well. Put differently, the chemical injection well 101 can be housed within the oil production well 102, such as via a concentric pipe arrangement, as an example. Wells often allow for the simultaneous introduction and removal of materials downhole. Such wells can be used as a chemical injection well 101 as well as an oil production well 102. In other embodiments, however, the wells are separate, as illustrated in FIG. 1.

Having separate locations for the chemical injection well 101 and the oil production well 102 allows the depth of each well to be directed to different depths to target the desired zone. Subterranean plots are full of various zones or pockets of different materials located at different depths. As an example, FIG. 1 illustrates a variety of zones. As depicted there is an oil zone 103, a gas zone 104, a reaction zone 105, and a water zone 106.

The oil zone 103 is a zone where pockets of oil have been discovered or are believed to be located. As noted, this oil is generally entrapped in porous geological formations. The pocket can be relatively small, or it can extend for miles and several hundred to a thousand feet in depth. It should be noted that while a zone is referred to an oil zone 103, gas zone 104, or water zone 106, this is a general description only and should not be deemed limiting. As an example, the oil zone 103 can comprise oil, gas, and water. Some gas and water can be entrained in the oil zone 103, as an example. In one embodiment, therefore, the oil zone 103 refers to a zone which is primarily oil.

The gas zone 104 is a zone of gas which is often adjacent an oil zone 103. The gas zone 104 often sits atop the oil zone 103 as gas is lighter than oil. As noted, while these zones are drawn as being distinct, in practice the zones typically comingle and overlap. Further, complete separation is not achieved. Thus, there will be often be gas entrained in oil and oil entrained in gas.

As depicted in FIG. 1, there is also a water zone 106. A water zone 106 is a pocket of water. The water can be a small discrete pocket of liquid water, or it can be a larger more expansive zone.

As noted, when oil has been removed from the oil zone 103, the rate of production declines. However, because oil is entrapped in porous rocks, if the pressure surrounding and within the oil zone 103 is increased, additional oil will escape the porous formations and travel downstream, i.e., toward the surface. As used herein, upstream and downstream refer to relative locations in the process. An event which occurs closer to the surface is referred to a downstream location whereas an event or location which occurs remote from the surface is referred to as being upstream of the surface.

One way to increase pressure is to increase the temperature of the formation. As temperature increases, the pressure also increases. An exothermic chemical reaction results in heat being released. If the reaction takes place adjacent the oil zone 103, this heat will cause the temperature and pressure of the gas zone 103 to raise. This in turn increases oil production.

There are a variety of chemical reactions which can be utilized to provide the heat. One example will be discussed herein using sodium. However, this is for illustrative purposes only and should not be deemed limiting. Sodium, potassium, and other reactive elements can also be utilized. Virtually any reaction which is exothermic can be utilized, however, there are environmental impact consequences which must be considered. In one embodiment any reactant which is exothermic with water can be utilized.

Additionally, while sodium metal is discussed, this is likewise for illustrative purposes only and should not be deemed limiting. In other embodiments the sodium is delivered in a solution or slurry. As but one example, the sodium can be in a solution with ammonia. Such an aqueous solution provides for an easier delivery medium. Further, sodium in solution, in some embodiments, is easier to transport and handle compared to metallic sodium.

Sodium is a metal which reacts with water. When it reacts with water, it can follow one of the two following reactions:

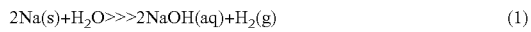
$$2Na(s)+H_2O \ggg 2NaOH(aq)+H_2(g) \quad (1)$$

$$2Na(s)+H_2O \ggg Na_2O+H_2(g) \quad (2)$$

If excess water is found, then reaction (1) typically follows. In reaction (1) sodium metal reacts rapidly with excess water to form sodium hydroxide and hydrogen gas. The sodium hydroxide is a colorless solution. As noted, the reaction is exothermic. Significant heat is released by this reaction.

Sodium hydroxide reacts in water to separate into sodium ions and negatively charged hydroxide ions. This reaction is also exothermic.

If excess sodium is found, then the reaction (2) occurs whereby sodium monoxide and hydrogen gas are produced. Sodium monoxide reacts with water to produce sodium hydroxide, and that reaction is also exothermic.

As can be seen, the reaction of sodium metal and water results, generally, in sodium hydroxide, hydrogen gas, and heat. Whichever reaction occurs, heat is released. This heat can used to heat the oil zone to result in increased production.

Hydrogen gas can react violently with oxygen and heat. Such a reaction causes an increase in temperature and pressure. Furthermore, the explosion of the hydrogen gas can create fractures which provide a path in which entrapped oil and gas can escape. Thus, to the extent oxygen is available to the hydrogen gas, this reaction can cause an explosion which further adds heat to increase the pressure.

In one embodiment the reaction occurs below the surface. In one embodiment the chemical and exothermic reaction occurs below an oil reserve or oil zone 103. The reactants, in one embodiment, include at least one injected reactant source and a second reactant. The second reactant can also be injected, but in some embodiments the reactants include at least one natural reactant. As used herein an injected reactant source is a source which is added to the reaction zone from an outside source, such as an injection well 101. Sodium metal distributed to the subterranean outlet 111 of the injection well 101 is an example of an injected reactant source. Conversely, a natural reactant is one which is already present and which need not be added. Naturally occurring water is an example of a natural reactant.

One embodiment will be described wherein sodium is injected to a natural occurring water source. This is for illustrative purposes only and should not be deemed limiting. In other embodiments, for example, water is also injected to the reaction zone 105. In such embodiments the reaction will contain two separated injected reactant sources.

FIG. 1 shows an oil zone 103 with a gas cap zone 104 and bottom water zone 106. The chemical reaction heats and pressurizes the oil zone 103. Further, the introduction of hydrogen gas increases volume to the gas zone 104 which increases the pressure to the gas zone 104. Thus, the gas zone 104 increases due to the increased volume of hydrogen gas, or other produced gases. This adds pressure to the oil zone 103 from the atop gas zone 104. Aside from increased pressure from the gas zone 104, the heat also increases pressure in the oil zone 103. The pressure itself is enough to cause oil from the oil zone 103 to flow. However, the increased temperature and pressure also decreases the viscosity of the oil in the oil zone 103. This mobilizes fluid movement and liberates immobile oil compartment areas. This allows liberated oil to move towards the inlet 112 and be directed toward the surface.

As shown, in one embodiment the subterranean outlet 111 of the injection well 101 is at a lower elevation than the inlet 112 of the oil production well 102. Lower in elevation means lower in relation. Thus, the subterranean outlet 111 at a vertical elevation which is greater than the inlet 112. As an example, if the inlet 112 is 500 feet below the surface, the outlet 111 is 1,000 feet below the surface. The reason for this is that hydrogen gas will tend to expand upward as it is lighter than oil and water. Thus, by ensuring the reaction occurs below the inlet 112 the pressure and the heat push upward toward the gas zone 103, in some embodiments. This helps increase the pressure and temperature of the entrapped oil and simultaneously decrease the viscosity of the entrapped oil.

As shown, the reaction zone 105 passes heat and hydrogen gas to the oil zone 103. The amount of heat and gas directed will depend upon the reaction, quantities of the reactants, location of the reaction, etc. However, the heat and increased pressure work together to increase production. As noted, due in part to decreased viscosity of the oil, the oil in the oil zone 103 is liberated and allowed to flow toward the production well. As heat and pressure are increased further, the production rate is further increased. This is true, in some embodiments, for wells which have had the production significantly decreased as the readily available oil has already been obtained. The increased heat and pressure, along with the decreased viscosity, allows previously unattainable oil to be obtained.

The precise increased production will be dependent on a host of factors including geological formation size and shape, proximity of the chemical injection wells 101 to the production well 102, proximity of the oil zone 103 to the reaction zone 105, the quantities and types of the reactants, etc. However, even a 1-2% increase in production flow rates is often enough to convert an unprofitable well into a profitable well. Put differently, the system and methods discussed herein, allow a well which would otherwise be plugged to remain economically viable for a longer period of time.

The placement of the chemical injection wells 101, and more importantly, the reaction zones 105 can be determined based on the location of the oil zone 103. As depicted, there are two chemical injection wells 101 located adjacent and on either side of the oil production well 102. In this manner, the two chemical injection wells 101 sandwich the production well 102. This is for illustrative purposes only and should not be deemed limiting. Thus, while this embodiment illustrates a reaction zone 105 which is adjacent the oil zone 103, in other embodiments the reaction zone 105 is placed in other locations, such as below the oil zone 103.

Figure 2:
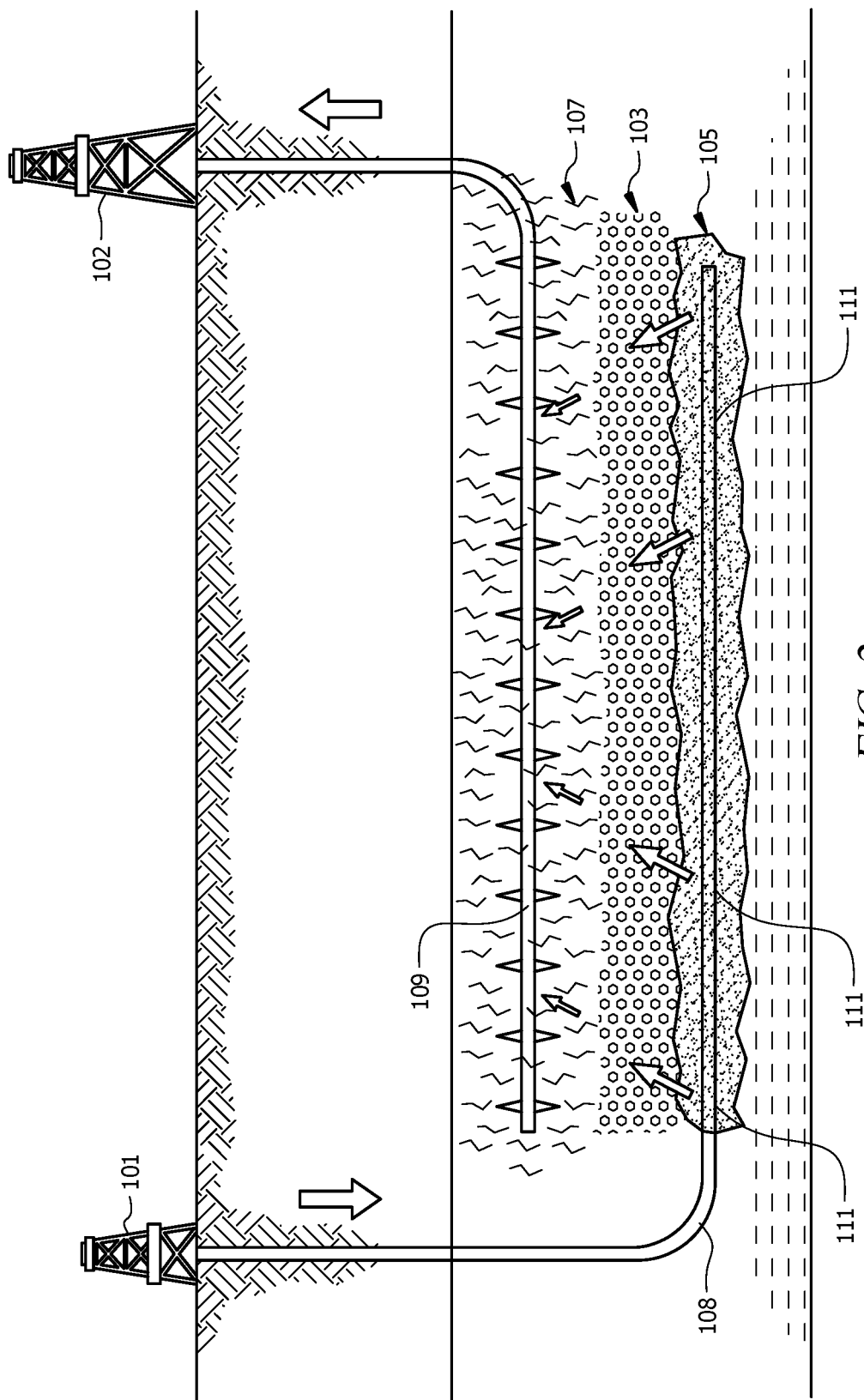
FIG. 2 is a schematic of a horizontal oil well in one embodiment.

FIG. 2 is a schematic of a horizontal oil well in one embodiment. In one embodiment, and as depicted, the oil well 102 can comprise a horizontal oil well. Often the horizontal wells have perforations, or inlets 112, so liberated oil can be pulled into the line and directed toward the well. In some embodiment at least a portion of the formation surrounding the well has been fractured via hydraulic fractures. Hydraulic fracturing is a process whereby cracks in the subterranean surface are opened and widened. This allows for the access of trapped oil and gas. The system used herein can be utilized on formations which have been fracked. Even wells which have been fracked have a production life. There is still oil to be recovered, and the process described herein provides an opportunity to liberate previously immobile oil as previously described herein.

It should be noted that while a single horizontal oil well is depicted, this is for illustrative purposes only and should not be deemed limiting. In other embodiments, for example, multiple horizontal wells are drilled in the same oil zone. Often they are drilled several hundred feet apart in a parallel relationship. The first well is referred to as a parent well with subsequent wells referred to as child wells. Often the parent and child wells are drilled at the same depth. In such embodiments one of such wells could function as an injection well to inject reactants to the zone. Likewise, a new injection well can be drilled. In either scenario, an injection well can service one or a plurality of production wells.

In FIG. 2, the production well 102 has a horizontal production well 109. The chemical injection well 101, as depicted, has a horizontal injection well 108 portion. As depicted, the horizontal injection well 108 is approximately parallel and below the horizontal production well 109. In this manner, the injection well 101 directs material to the horizontal injection well 108. The material is allowed to react in the reaction zone 105 which is below the oil zone 103. The heat and gas produced by the reaction increase the temperature and pressure in the oil zone 103. As noted, this also decreases the viscosity of the immobile oil. The increased temperature and pressure, and decreased viscosity, cause otherwise immobile oil to liberate and be collected in the horizontal production well 109. The oil can be captured and processed downstream.

In FIG. 2, the hydraulic fractures 107 provide increased paths through which the entrapped oil can travel. This also causes pathways for the hot hydrogen gas as well as heat to pass to the oil zone 103. Accordingly, the hydraulic fractures 107 can increase the heat transfer from the heat of reaction. Further, the fractures 107 provide locations in which the hydrogen gas, and other gasses, to become trapped, further increasing the pressure at the site of the fractures. This increases the production of oil through the well. As before, oil which was previously immobilized, becomes liberated and therefore recoverable.

Figure 3:
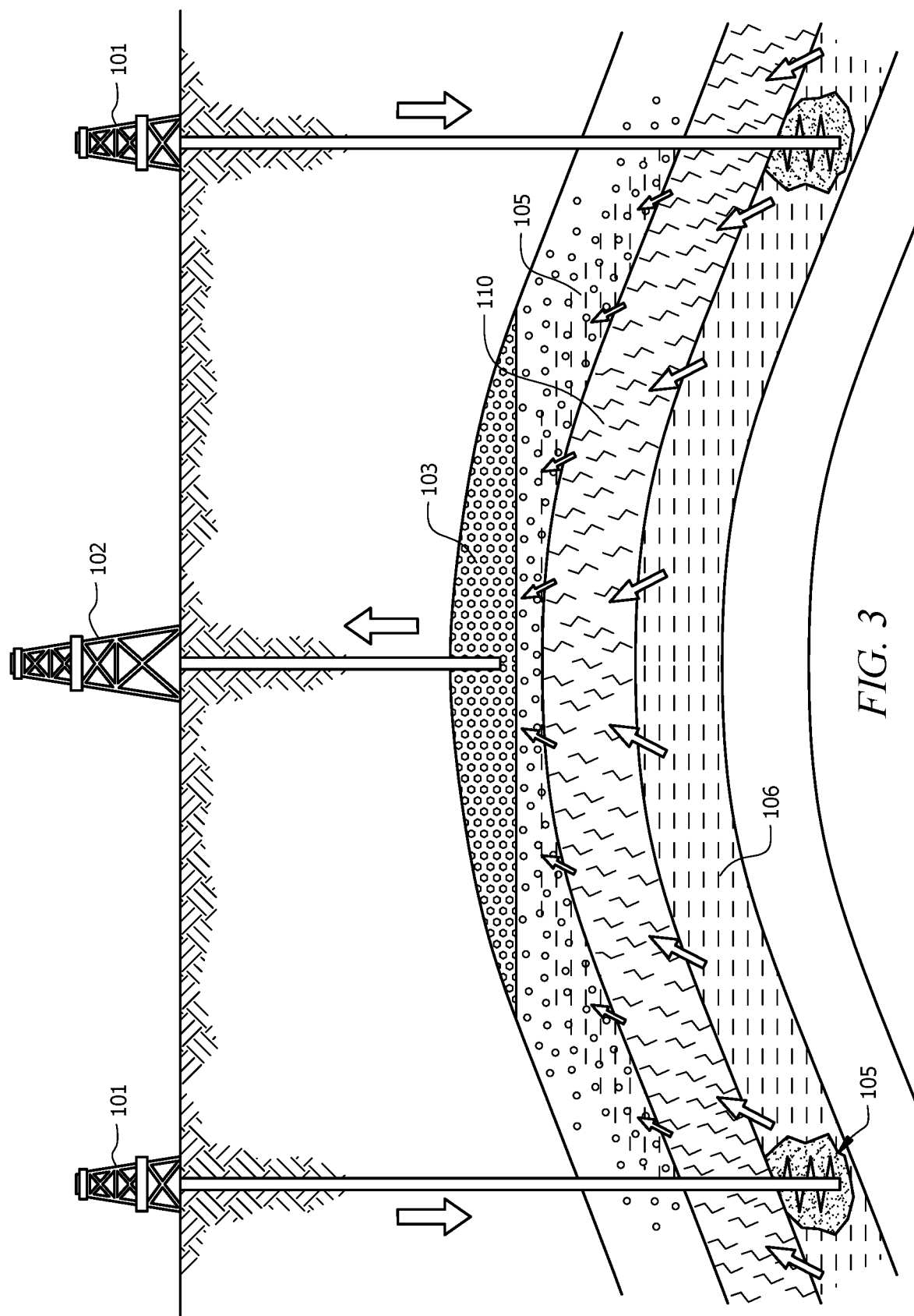
FIG. 3 is a schematic of a refilled conventional oil zone in one embodiment.

FIG. 3 is a schematic of a refilled conventional oil zone in one embodiment. As shown there are two chemical injection wells 101 and a single oil production well 102. As depicted the oil production well 102 is coupled to an oil zone which was previously depleted. However, with the addition of the chemical injection wells 101, the heat, pressure, and gas produced by the reaction has caused the once depleted oil zone 103 to become refilled. The process works as previously noted. The reaction zone 105 introduces heat and pressure to the adjacent shale zone 110. The heat, increased pressure, and decreased viscosity causes previously immobile oil to become liberated. The liberated oil from the shale zone 110 travels upward toward the oil zone 103. If it encounters a water zone 105, as shown, the lighter oil 103 will raise toward the top. Accordingly, the previously depleted or partially depleted oil zone 103 is refilled. The production of oil through the production well 102 can either begin anew, or the production rates will increase.

As noted, various chemical reactions can be utilized to provide the heat and pressure which liberates the entrapped oil. The rate of these reactions, and consequently the heat provided and the gas produced, can be controlled by controlling the quantity of reactants applied to the reaction zone 105.

In one embodiment as much of the reaction as possible occurs at the reaction zone 105, whereas reaction within the well 101 is avoided. The reason is it is desirable, in some embodiments, to focus the heat and gas produced by the reaction at the immobilized oil. If the reaction takes place, for example, at the chemical injection well, then the temperature of the ground surface will increase. This will have no impact on the temperature of the shale zone 103 which holds the immobilized oil. Consequently, it is desirable, in some embodiments, to focus the reaction near the immobilized oil to maximize the effects of the reaction.

One example of the reactions which can be utilized, as discussed above, is the reaction of sodium with water. Sodium is relatively inexpensive, and the water is often already present near the entrapped oil. Consequently, the reaction is initiated by bringing sodium into the presence of water.

Sodium reacts with water at very high temperatures due to the exothermic nature of the reaction. Consequently, in one embodiment a portion of the chemical injection well 101 comprises materials designed to withstand the high reaction temperatures. As an example, in one embodiment the chemical injection well 101 comprises a reaction tip which is the location where the reactants in the injection well 101 exit from the well at the subterranean outlet 111. The reaction tip can comprise ceramic or other materials which allow the tip to withstand the 1,000° C. associated with the reaction.

The sodium can be delivered to the reaction zone 105 via virtually any method or device known in the art. In embodiments wherein the sodium comprises metallic shavings, for example, the chemical injection well 101 can comprise augers or the like which are designed to move such types of solids. The rate of the reaction, and as a result the temperature and pressure, can be controlled by controlling the quantity of sodium delivered to the reaction zone 105.

In one embodiment the chemical injection well 101 offers metered amounts of sodium as opposed to a continuous flow. A metered introduction of sodium provides an increased opportunity to control the flow and, consequently, the reaction of sodium. In such embodiments a desired amount of sodium is introduced to the reaction zone. The reaction is allowed to progress. Thereafter, after sufficient time has elapsed, additional sodium is introduced and the process is repeated.

The time between batches of sodium depends upon a variety of factors including the size of the batch, the availability of water in the reaction zone, the desired temperature and pressure in the oil zone 103, the production rate, etc. In one embodiment the time between batches of sodium introduced into the reaction zone 105 ranges from 10 seconds to 5 hours. As an example, in one embodiment sodium is introduced every 30 seconds, whereas in another embodiment the sodium is introduced every ten minutes.

Providing time between reactions allows the heat generated to begin to transfer and dissipate. Time also allows for the secondary reactions discussed above to occur. Further, the time allows the hydrogen gas generated by the reaction to expand and travel. The time also allows water, which can be displaced during the reaction, to be directed back toward the reaction zone 105 for additional and subsequent reactions. Finally, the time also allows a break in the injection well to ensure that the introduced reactants have reacted and to limit the reaction to the reaction zone 105.

The time between reactions can be controlled via a variety of different methods. In one embodiment, for example, the chemical injection well 101 comprises a valve which closes after the desired mass or volume of reactants has passed. The chemical injection well 101 can include other equipment, such as a check valve, which prevent the reaction from undesirably traveling upward toward the chemical injection well 101.

As noted, in one embodiment the reactants are added in a batch or semi-batch state. In other embodiments, however, the reaction is continuous. As such, continuous, or somewhat continuous reactants are directed toward the reaction zone 105. Rather than controlling time between batches, as previously described, the amount and flow rate of the reactants is adjusted to achieve the desired temperature, pressure, etc.

The chemical injection well 101 can have any necessary equipment to monitor and control the reactants. This can include flow meters, valves, temperature sensors, pressure sensors, etc. In one embodiment a temperature sensor is placed at or adjacent to the reaction zone 105. These sensors can be used by an operator or operating system to determine how many reactants to deploy downhole.

In one embodiment, the operating system, as an example, can utilize information obtained from the oil production well 102 in determining how best to control the injection flow rate, quantities, etc. The operating system can monitor the temperature, flow rate, viscosity, and other variables of the oil recovered and at the oil production well 102. This data can be used by the injection controller to control the reaction. As an example, if the recovered oil's viscosity begins to increase, the rate of reaction can increase. Furthermore, if the rate of recovery decreases, the rate of reaction can increase. Conversely, if the rate of production is higher than desired and the viscosity is too low, the rate of reaction can decrease. The reaction may stop or pause for a bit, or the rate of reaction can be slowed.

Virtually any type of controller can be utilized for the chemical injection well 101. As noted, in some embodiments data from the oil production well 102 is used to by the controller's logic in determining outputs from the controller. In one embodiment the controller utilizes real-time data obtained from the oil production well 102 to make adjustments. Additionally, in some embodiments the controller can utilize sensors not located on the oil production zone. As an example, temperature sensors located near the surface, or even closer to the oil zone 103 can provide updates on the reaction.

An untreated oil zone 103 refers to an oil zone 103 which has not been temperature treated via a chemical reaction, as discussed herein. An untreated oil zone 103 will be several degrees cooler than a treated oil zone 103. Consequently, when the system is first used on an untreated oil zone 103, comparatively increased reactions at the reaction zone 105 are necessary, in some embodiments, to get the oil zone 103 to the desired temperature. However, once the oil zone 103 has reached the desired temperature, the chemical reaction is simply used to maintain the temperature rather than increase the temperature. In such embodiments, the quantity, number, and/or duration of the reactions in the reaction zone 105 can be reduced.

Turning back to FIG. 2, the delivery of reactants to the reaction zone 105 is an elongated pipe with several outlets 111 as opposed to a pipe with a single outlet 111 as in FIG. 1, for example. In FIG. 2, comparatively smaller reaction zones 105 extend for the length, or a portion of the horizontal length under the horizontal well. There can be one or more reaction zones. Thus, for example, there can be two outlets or one-hundred outlets, or more, located on the horizontal portion 10 of the injection well 101.

There are a variety of methods which can be used to distribute the reactants at several outlets along a pipe. As noted, one or more outlets can be coupled to a valve which controls the release of the agents. In another embodiment a mechanical sleeve can be utilized. Assume a sleeve which has holes which can align with the outlet ports on the horizontal portion 108 of the injection well 101. When the holes align reactants exit to the reaction zone 105. However, when the sleeve and/or well are laterally moved so that the holes do not align, flow of the reactants through the outlet ports is stopped. In this manner, the reaction can be controlled by manipulation of the sleeve relative to the horizontal portion 108.

While the invention has been particularly shown and described with reference to a preferred embodiment, it will be understood by those skilled in the art that various changes in form and detail may be made therein without departing from the spirit and scope of the invention.

What is claimed is:

1. A system for heating of unrecovered oil, said system comprising:
   i. a chemical injection well having at least one subterranean outlet;
   ii. an oil production well with at least one subterranean inlet;
   iii. wherein said subterranean outlet is lower in elevation than said at least one inlet, and wherein said chemical injection well is separate and apart from said oil production well;
   wherein said chemical injection well is coupled to an injected reactant source, and wherein said injected reactant source reacts with a second reactant in an exothermic reaction which produces hydrogen gas, and wherein said reactant source comprises aqueous sodium; and wherein said second reactant comprises water;
   a controller, and wherein said controller receives data from said oil production well and uses said data to control the release of said injected reactant source and to control the exothermic reaction.

2. The system of claim 1 wherein said inlet is located in an oil zone, and wherein said at least one subterranean outlet is located in a reaction zone, and wherein said reaction zone comprises water.

3. The system of claim 1 wherein said at least one subterranean inlet is for capturing oil and gas, and wherein said at least one subterranean outlet is for dispensing a reactant.

4. The system of claim 1 wherein said at least one subterranean inlet is on a vertical well.

5. The system of claim 1 wherein said at least one subterranean inlet is on a horizontal well.

6. The system of claim 5 wherein said horizontal well has a horizontal portion, and wherein said chemical injection well comprises a horizontal portion which is below and approximately parallel with the horizontal portion of the horizontal well.

7. The system of claim 2 wherein said at least one subterranean outlet comprises an outlet tip which can withstand temperatures greater than 1000° C.

8. The system of claim 1 wherein said second reactant is a natural reactant.

9. A method for capturing oil, said method comprising the steps of:
   i. injecting at least one injected reactant through at least one subterranean outlet on a chemical injection well to a location below an oil reserve,
   ii. allowing for an exothermic reaction between said at least one injected reactant and one natural reactant, wherein said exothermic reaction heats at least a portion of said oil reserve, and wherein said exothermic reaction produces hydrogen gas;
   iii. liberating entrapped oil in said oil reserve to create liberated oil;
   iv. capturing said liberated oil via at least one subterranean inlet on an oil production well, wherein the at least one subterranean outlet is lower in elevation than the at least one subterranean inlet; wherein said chemical injection well is separate and apart from said oil production well; wherein said injected reactant comprises aqueous sodium, and wherein said natural reactant comprises water;
   v. receiving data from said oil production well via a controller, wherein said controller uses said data to control the release of said injected reactant source and to control said exothermic reaction.

10. The method of claim 9 wherein said exothermic reaction decreases the viscosity of said entrapped oil.

11. The method of claim 9 wherein said oil production well is a vertical well.

\* \* \* \* \*